April 13, 1937. E. F. OHLENDORF 2,076,666
PLOW
Filed Feb. 26, 1934   3 Sheets-Sheet 1
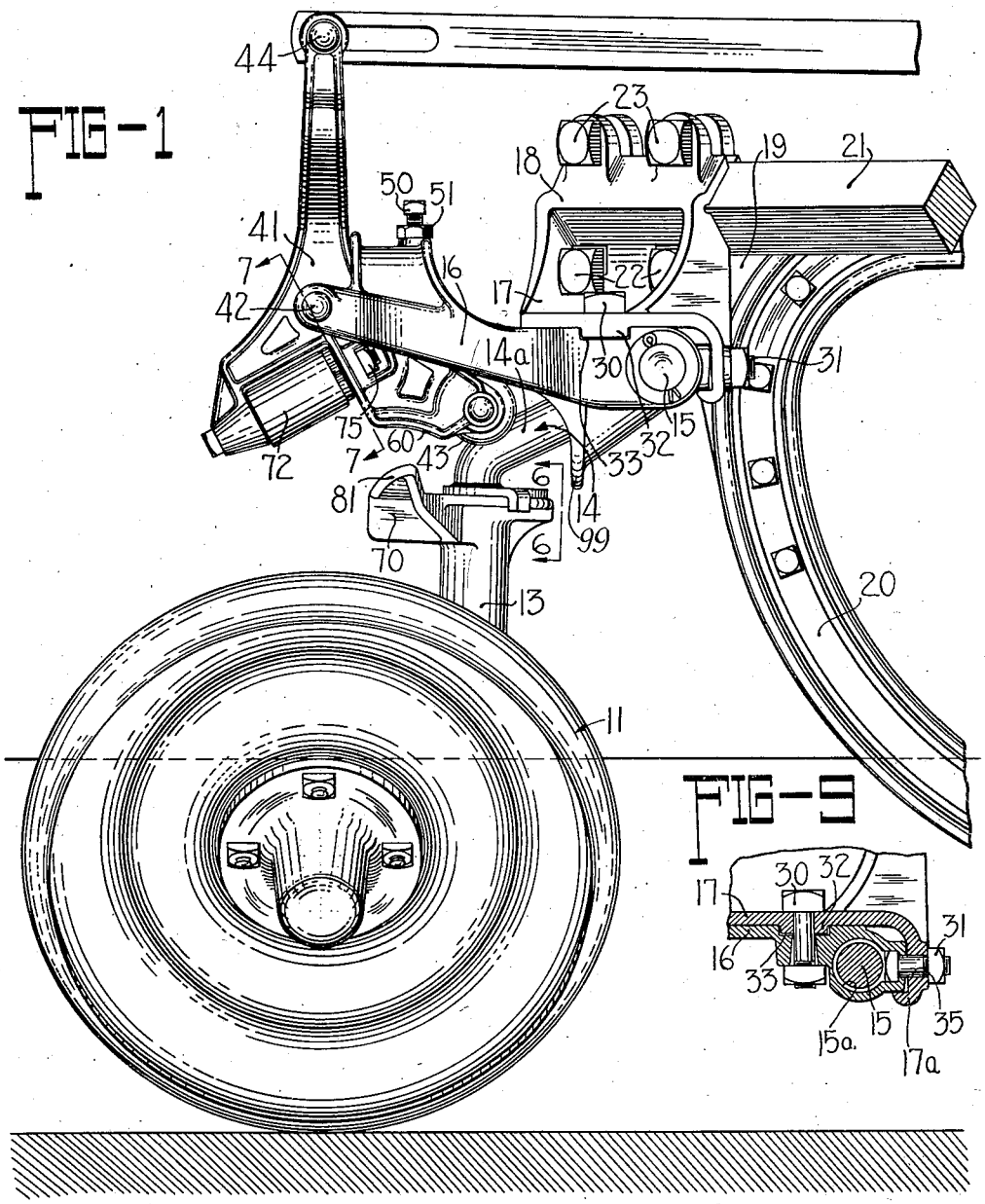
INVENTOR
Emil F. Ohlendorf
BY Brown, Jackson, Boettcher & Dienner
ATTORNEYS.

April 13, 1937. E. F. OHLENDORF 2,076,666
PLOW
Filed Feb. 26, 1934 3 Sheets-Sheet 2
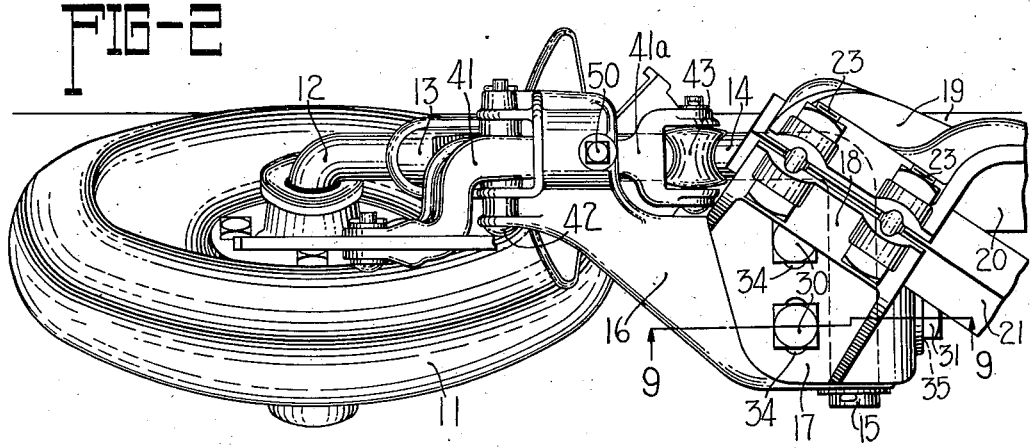
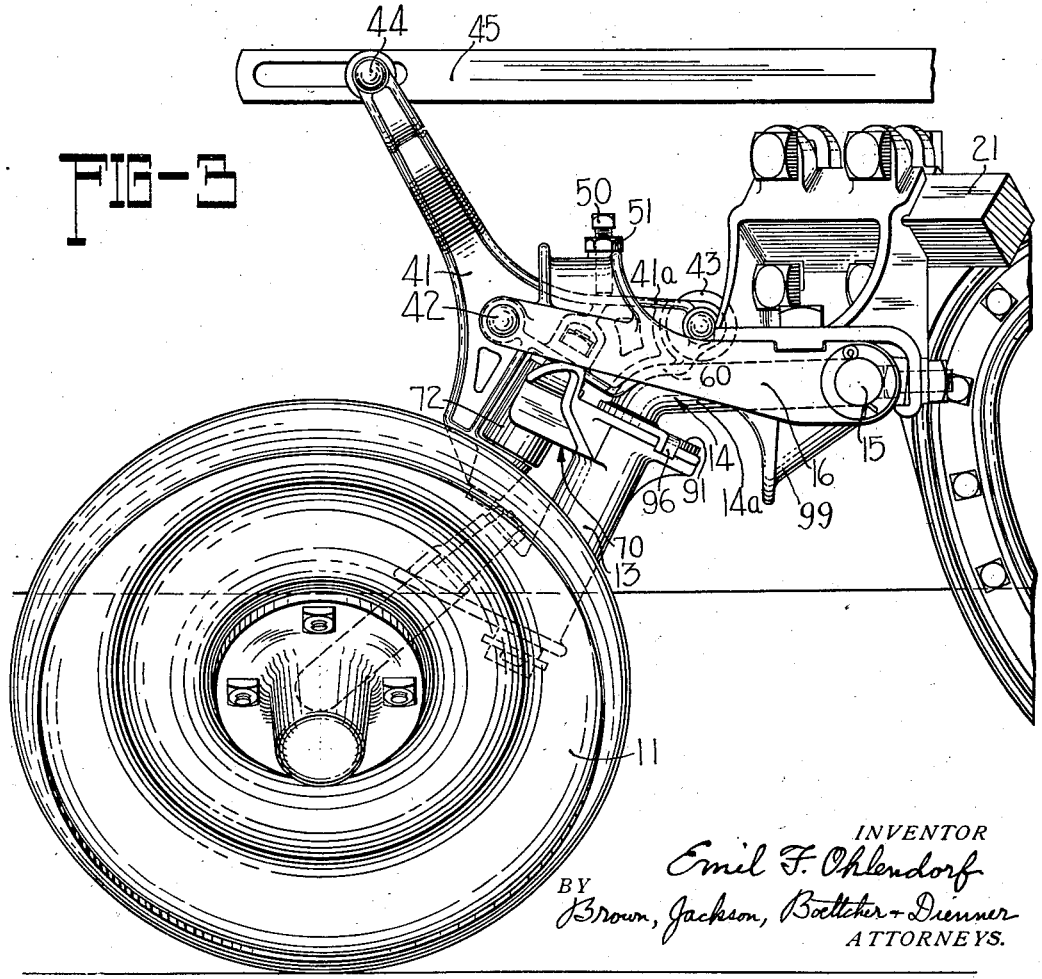

April 13, 1937.  E. F. OHLENDORF  2,076,666
PLOW
Filed Feb. 26, 1934  3 Sheets-Sheet 3
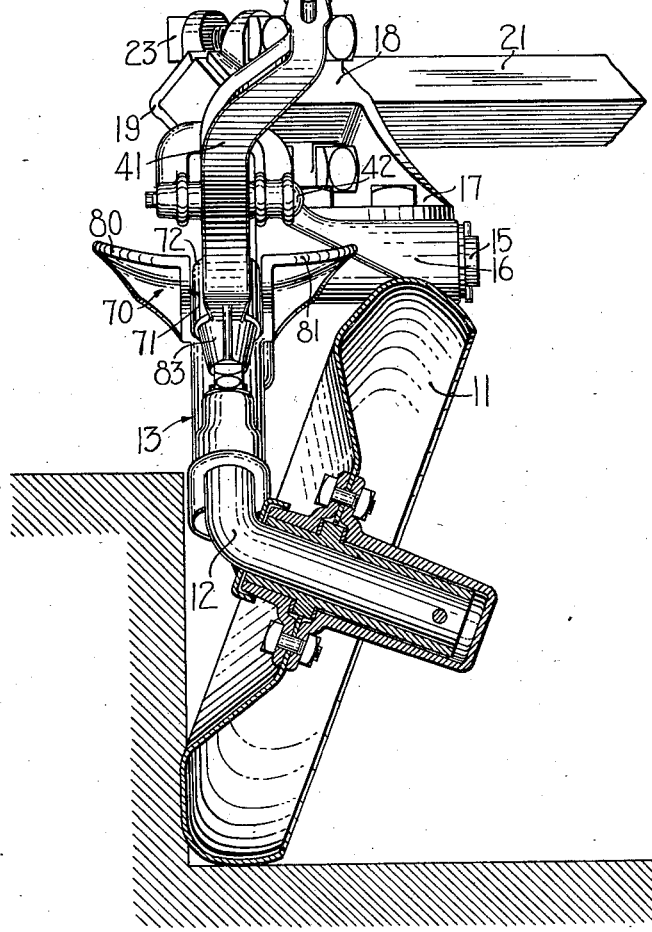
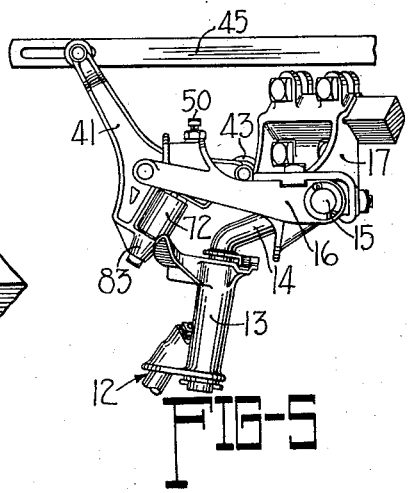
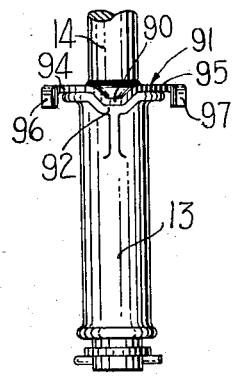
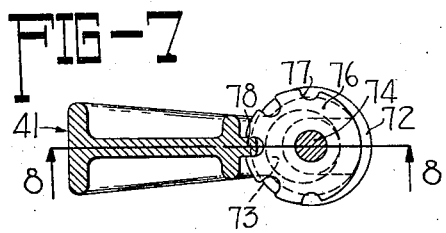
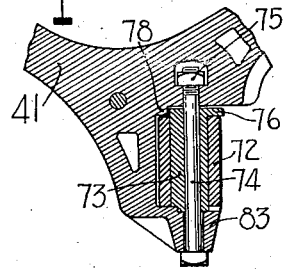
INVENTOR
Emil F. Ohlendorf
BY Brown, Jackson, Boettcher & Dienner
ATTORNEYS.

Patented Apr. 13, 1937

2,076,666

UNITED STATES PATENT OFFICE 2,076,666

PLOW

Emil F. Ohlendorf, Moline, Ill., assignor to Deere & Company, Moline, Ill., a corporation of Illinois Application February 26, 1934, Serial No. 712,874

32 Claims. (Cl. 97—127)

The present invention relates to improvements in plows, and has more particularly to do with the rear furrow wheel structure and the means for connecting such structure to the plow.

As is well known to those skilled in the art, what are ordinarily known as riding plows or tractor plows are provided with a rear furrow wheel pivotally connected to the plow structure for vertical swinging movement, such furrow wheel running in the furrow behind the plow body in a one bottom plow or behind the rear plow body in a structure having two or more plow bottoms when the plow is in operating position. This furrow wheel is adapted to be swung downwardly relatively to the plow structure on its pivotal connection therewith for raising the plow body or bodies to transport or inoperative position, and to be swung upwardly on such pivotal connection to lower the plow body or bodies to working or operating position, the power for swinging the furrow wheel on its pivot being derived from the main crank axle of the plow, as is usual in such constructions.

The present invention has for one of its objects the provision of improved means for so connecting the furrow wheel supporting structure to the plow beam that such structure may be readily adjusted laterally relatively to said beam without disturbing any of the several parts of the operating mechanism of the supporting structure or their operative relations.

Another object of the present invention is to provide improved means for connecting the furrow wheel supporting structure to the plow beam whereby the assembling of plows of different sizes is simplified, making it possible to readily convert one size plow into another size, as for example, a four-bottom plow into a three-bottom plow.

A further object of the present invention is to provide improved means for determining the vertical position of the furrow wheel with respect to the rear plow bottom, and which means also provides for adjusting this position when necessary.

A still further object of the invention is the provision of means for taking the load or weight of the plow when the plow is in operating position, thereby preventing wear of certain parts of the plow raising mechanism when the plow is in operating position.

A still further object of the invention is to provide improved means by which the lead of the furrow wheel may be adjusted when the plow is in operating position.

A still further object of the invention is the provision of improved means for locking the rear furrow wheel against castering movement when the plow is in operating position, and to cause the wheel support to swing back into normal position for locking it against castering after the furrow wheel and its support drops downwardly relatively to the plow, as when the plow is forced upwardly out of the ground from any cause, such as by striking an obstruction.

A still further object of the invention is the provision of means to prevent the castering of the rear furrow wheel upon backing of the plow when it is in transport position and to permit castering of such furrow wheel to a limited extent in the lateral turning of the plow when in such position.

Further objects and advantageous features will be apparent from the following description of the preferred embodiment of the invention, taken in connection with the accompanying drawings in which:

Figure 1 is a side elevational view of the rear portion of a plow beam with the improved rear furrow wheel supporting structure and plow raising means attached thereto, and illustrating the various parts in the positions they assume when the plow is in raised or transport position;

Figure 2 is a top plan view of the several parts when the plow is in transport position;

Figure 3 is a view similar to Figure 1 but illustrating the parts in the positions they assume when the plow is in working position;

Figure 4 is a rear elevational view of the several parts when the plow is in working position, the furrow wheel being illustrated in cross-section;

Figure 5 is a side elevational view of the several parts shown in the previous figures, but on a smaller scale, illustrating the positions such parts assume when the furrow wheel falls down into the bottom of the furrow upon the plow encountering an obstruction which forcibly guides the rear portion of the plow to or near the surface of the ground, and illustrating the means for moving the wheel support into proper position for locking it against castering movement when the plow assumes its proper working position;

Figure 6 is a fragmentary view taken along the line 6—6 of Figure 1 and illustrating the gravity lock for preventing the furrow wheel from castering when backing the plow while in transport position but which is releasable to permit the wheel to caster to a limited extent when turning the plow as at the end of the field;

Figure 7 is a cross-sectional view taken on the plane of the line 7—7 of Figure 1 and illustrating the cam mounting of the roller of the furrow wheel locking means by which the furrow wheel is locked against castering when the plow is in operating position, and by which the lateral position of the furrow wheel may be adjusted;

Figure 8 is a fragmentary cross-sectional view of the several parts shown in Figure 7 taken on the plane of the line 8—8 of Figure 7; and Figure 9 is a fragmentary vertical cross-sectional view taken on the plane of the line 9—9 of Figure 2 and illustrating the means for adjustably connecting the frame member of the rear furrow wheel supporting structure to its supporting bracket whereby said frame member may be adjusted laterally relatively to said bracket.

The construction illustrated comprises a rear furrow wheel 11 journaled on an axle 12 supported in fixed position in a wheel support or member 13 in the form of a suitable casting. The means for mounting the wheel 11 on the axle and for supporting the axle in the member 13 are fully illustrated and described in and form the subject-matter of the copending application of Carl G. Strandlund, filed February 26, 1934, Serial No. 712,879, and it is therefore not believed to be necessary to illustrate and describe the same in full herein, although Figure 4 illustrates in section the construction of the furrow wheel and the means for mounting it on the axle.

The wheel support 13 is provided with a bearing portion journaled on a member 14, and as shown the lower end of such member extends through the bearing portion of the support and is held in place by a cotter pin or in any other suitable manner. The member 14 is provided with a laterally bent portion 15 which is journaled in a transversely extending bearing opening 15a (see Figure 9) provided in a frame member 16, whereby the member 14 will swing vertically in the plow raising and lowering operations as hereinafter described. The frame member 16 is supported on a bracket 17 preferably formed integral with a cap 18, the connection between the frame member 16 and the bracket 17 being such that the frame member 16 may be adjusted laterally relatively to the bracket when desired, as will be hereinafter described.

It may be well to state here that although the present construction is adapted for use in connection with a plow having only one plow bottom, it is also adapted for use with plows equipped with two or more plow bottoms, and as certain features of the invention have to do with such latter plows the invention has been illustrated in connection with such a construction. However, only the rear portion of the rear plow beam 20 and the rear end portion of the usual diagonally disposed frame bar 21, which connects the several plow beams of the plow together at their rear ends, have been illustrated in the drawings, as that is deemed sufficient for the purpose.

Each plow beam 20 has a bracket 19 fixed thereto in any suitable manner (not shown) and provided with a right angular shaped recess for receiving the frame bar 21 which is of square cross-section as shown. The frame bar 21 is clamped to the bracket 19 by means of the cap 18 before mentioned, which is also provided with a right angularly shaped recess oppositely disposed to that in the bracket 19 for receiving the frame bar 21, these three elements being connected together by bolts 22 and 23 extending through alined openings provided therefor in the cap and bracket below and above the frame bar 21, respectively, as best shown in Figure 1.

The corresponding parts of plows of different sizes, whether two, three, four, or five bottom plows, are identical except that the caps 18 associated with the plow beams other than the rear plow beam are not provided with an integral bracket 17 as they do not support a rear furrow wheel. This construction makes it possible to readily convert one size plow into another size plow, say, for example, a four bottom plow into a three bottom plow, by removing the rear plow beam and moving the cap 18 supporting the rear furrow wheel structure to take the place of the next adjacent cap, as will be readily understood.

As best shown in Figure 9, the frame member 16 of the rear furrow wheel structure is secured to the underside of the bracket 17 by means of bolts 30 and 31, and as shown the bracket 17 is provided with a transversely extending key 32 formed integral with and extending downwardly from its lower side which engages in a transversely disposed recess 33 provided in the upper side of the frame member 16. The bolts 30 pass through transversely disposed slots 34 (see Figure 2) provided therefor in the bracket 17 and through holes in the frame member 16 alined with said slots. The bolt 31 passes through a transversely disposed slot 35 in the downwardly depending portion 17a of the bracket 17 and through an alined opening in the forward end of the frame member 16, which opening communicates with the bearing opening 15a as shown in Figure 9. These slots 34 and 35 provide for adjusting the lateral position of the frame member 16 relatively to the bracket 17 to shift the lateral position of the rear furrow wheel 11 with respect to the landside of the rear plow bottom, as will be readily understood. This can be quickly and easily accomplished by merely loosening the nuts on the bolts 30 and 31 and moving the frame member 16 laterally to the desired position, the key 32 sliding in the recess 33 during such movement, after which the nuts are again tightened on the bolts to rigidly clamp the frame member 16 and bracket 17 together again.

The means for raising the plow relative to the rear furrow wheel for placing the plow in transport position will now be described. As shown in Figures 1 to 4, the raising of the plow is effected through a lifting mechanism comprising a lever 41 pivotally connected at 42 to the rear end portion of the frame member 16. Formed integral with the lower end of the lever 41 is a forwardly extending arm 41a, the forward end of which is bifurcated as shown in Figure 2 and carries a roller 43.

As best shown in Figures 1, 2 and 3, the roller 43 rests on the rearwardly extending portion 14a of the member 14 and is adapted to roll along said portion 14a when the lever 41 is rocked in a clockwise direction from the position shown in Figure 3, in which position the plow is in operating position, to the position shown in Figure 1, thereby raising the plow to inoperative or transport position. The power to rotate the lever 41 as just described is obtained through a tension rod 45 pivotally connected at its rear end with the lever 41, as shown at 44, and connected at its forward end with an arm on the main crank axle of the plow (not shown) whereby said rod 45 and lever 41 will be pulled forwardly when the main crank axle is rotated to lift the plow, as is common in power lift plows and will be readily understood by those skilled in the art.

The vertical position of the rear furrow wheel 11 with respect to the rear plow body (not shown) which is carried by the rear plow beam 20 of the plow, is determined by a set screw 50 extending through the rear portion of the frame member 16 forward of the pivotal connection of the lever 41 therewith. The set screw 50 contacts with the upper surface of the arm 41a of the lever 41 (as shown in dotted lines in Figure 2) to limit the swinging of the lever 41 beyond the position determined by the adjustment of the set screw 50 when the plow is dropped to working position. As will be readily apparent, the set screw 50 can be screwed up or down in the frame member 16 to adjust the vertical position of the rear furrow wheel 11 relative to the rear plow body when the plow is in working position, and the relative positions of the furrow wheel and the rear plow body will remain the same until the set screw is again adjusted to change the adjustment thereof. A lock nut 51 is provided for locking the set screw 50 in any adjusted position to which it may be set.

In prior constructions provided with a roller such as 43 riding on a member such as 14 in the raising and lowering of the plow and in which the weight of the plow, when in operating position, is transmitted directly through the roller 43 to the wheel 11, there was a tendency for the roller to wear a depression in the member 14 out of which it was difficult to move the roller to raise the plow, and, therefore, I have provided improved means for taking the stress off of the roller 43 when the plow is in operating position. This means comprises a pad 60, shown in dotted lines in Figure 3, provided on the under side of the arm 41a and preferably formed integral therewith in rear of the roller 43. The pad 60 is adapted to contact with the member 14 at the bend therein above the wheel support 13 when the plow is in lowered or operating position. Through the provision of this pad 60, the weight of the plow is transmitted through the frame 16, the set screw 50, the arm 41a, the pad 60, and the member 14, to the wheel 11 independently of the roller 43, and the roller is thus under no stress when the plow is in operating position. By thus relieving the roller 43 from such stress, there is no tendency for the roller to wear a depression in the member 14, and the difficulty mentioned above is avoided.

In plows of this type provided with a rear furrow wheel, it is desirable that the furrow wheel be prevented from castering when the plow is in working position, while permitting it to caster to a limited extent when the plow is in transport position, and also to increase or decrease the tendency of the rear furrow wheel to run furrowward as may be desirable under certain operating conditions, and to this end I have provided improved means for accomplishing such results which will now be described. Formed integrally with the wheel support 13 is a forked member, indicated as an entirety by the reference numeral 70, provided with a centrally disposed slot 71 (see Figure 4) to receive a roller 72 carried by the lower portion of the lever 41. As shown in Figures 7 and 8, the roller 72 is journaled on a sleeve 73 eccentrically mounted on a bolt 74 fixedly supported on the lower end of the lever 41 by means of a nut 75. The eccentric sleeve 73 is provided with an outwardly extending flange 76 formed integral with its upper end and provided with a series of notches 77 formed therein for engagement with a lug 78 formed integral with the lower portion of the lever 41 and extending into the space occupied by the roller 72.

The position of the sleeve 73 relative to the lever 41 may be readily changed by removing the bolt 74 and rotating the sleeve in one direction or the other, as desired, to cause the lug 78 to engage in the selected one of the notches 77, after which the bolt is replaced and secured in position. As will be readily understood, by shifting the position of the eccentric sleeve 73 the roller 72 can be shifted laterally to change the lead of the furrow wheel 11, that is, increasing or decreasing the tendency of the wheel to run furrowward.

When the plow is raised to transport position as shown in Figure 1, the roller 72 is completely removed from the fork member 70, and at that time the wheel 11 will be free to caster to a limited extent as hereinafter described, and as said wheel may be turned to one side or the other from that shown in the drawings when the plow is lowered, the forked member or bracket 70 is provided with outwardly extending guide arms 80 and 81, one on each side of the slot 71, for guiding the roller 72 into the slot 71 upon the lowering of the plow to working position.

It occasionally happens that when the plow is in operation in the field and some rigid object, such as a large stone, for example, is encountered, the rear end of the plow is forcibly guided to or near the surface of the ground by such rigid object. If this should occur, the wheel 11 is free to drop down into the bottom of the furrow in back of the plow, and if the wheel drops, it may at the same time turn to one side or the other from its line of travel. When such rigid object is passed or the wheel 11 begins to ride up on top of it, the member 14 will again be swung upwardly, in a clockwise direction as viewed in Figure 5, to its normal operating position. It is, of course, necessary in such a situation that the wheel support 13 be brought again to its proper normal position so that the roller 72 will engage in the notch 71 to thereby prevent castering movement of the wheel when in operating position, and therefore provision has been made for accomplishing that purpose. As illustrated, the tip portion of the lower end of the lever 41 below the roller 72 is made cone-shaped as indicated at 83 so that when either one of the guide arms 80 or 81 strikes such tip portion 83 the wheel support 13 will be caused to rotate to its normal position to seat the roller 72 in the slot 71. If desired, however, this same result can be obtained by making the roller 72 somewhat longer, as will be readily appreciated, but it has been found satisfactory to form such tip at the lower end of the lever 41 of cone shape, thus avoiding the necessity of using a longer roller than the one illustrated.

The position of the various parts in the situation described in the last preceding paragraph is illustrated in Figure 5, and it may be well to point out that such situation occurs only under the circumstances as noted above. It does not occur in the normal operation of lowering the plow from transport to operating position. During the normal lowering operation, the lever 41 and the member 14 of the furrow wheel supporting structure move together, the roller 43 remaining in contact with the member 14 during such movement, and as a result, the lever 41 will be in such a position that one or the other of the guide arms 80 or 81 will strike the lower portion of the roller 72 and not the tip 83 of the lever 41. It is only when the lever 41 is held in the position shown in Figures 2 and 5 by the lifting bar 45 in its rearward position, or the position it occupies when the plow is in working position, and the member 14 is moved away from the roller 43, as shown in Figure 5, that the wheel support 13 can be rotated to such a position that one or the other of the guide arms 80 and 81 will contact with the cone-shaped tip 83 below the roller 72.

It is sometimes desirable to back the plow when it is in raised position, as in order to get close to a fence at the end of a field or to back it into a shed or barn, and since the furrow wheel 11 is mounted for free castering movement to a certain extent on the spindle portion of the member 14 when the plow is in raised position, it will ordinarily caster and steer the plow off to one side or the other, making the maneuvering of the plow in such situation very difficult. It will be seen, therefore, that while it is essential that the wheel 11 has a certain amount of castering movement when the plow is in transport position to facilitate making turns, it is also desirable that the wheel 11 be held against free castering movement when backing the plow, and to this end means has been provided for accomplishing that purpose. This means is in the form of what may be termed a gravity lock which has been found to be sufficient to hold the wheel 11 against castering except when an appreciable amount of lateral stress is imposed on the wheel as is the case when a turn is made at the end of the field with the plow in raised position.

The gravity lock is best shown in Figure 6 and comprises a lug 90 formed on the lower side of a flange 91 fixedly secured to or formed integral with the spindle portion of the member 14 of the wheel supporting structure by offsetting a portion of such flange. The lug 90 normally engages in a depression 92 formed in the upper end of the bearing portion of the wheel support 13, and the sides of the lug 90 and also the sides of the depression 92 are inclined as shown. As a result of this structure, the wheel 11 cannot caster to one side or the other without first raising the plow sufficiently to cam the lug 90 out of the depression 92, which action occurs only when an appreciable amount of lateral stress is imposed on the wheel such as when turning the plow at the end of a field.

In order to provide for the wheel 11 having castering movement only to a limited extent when the plow is in operating position, the flange 91 is provided with a pair of outwardly extending arms 94 and 95 formed integral therewith and having depending lugs 96 and 97, respectively, which are disposed so as to contact with the forward side portions of the guide arms 80 and 81, respectively, upon castering movement of the wheel when the plow is in raised position to thereby limit the castering movement of the wheel 11, as will be readily understood.

In order to prevent the wheel 11 from striking the rear plow body if the wheel should strike an obstruction when backing the plow, a stop member 99 (see Figures 1 and 3) has been provided. This stop member 99 is formed as an integral part of the casting 16 and extends downwardly therefrom, the lower portion of said casting underlying the axle portion 14a and limiting the counterclockwise movement thereof about its axis 15, as will be readily understood.

I claim:

1. The combination with a plow including a plow beam, of a rear furrow wheel support comprising a frame adjustably connected to said beam for transverse adjustment relative to said beam, a member pivotally connected to said frame for vertical swinging movement, means movable relative to said member for swinging the latter to raise the plow from operating position to raised position, and a rear furrow wheel supported by said member.

2. The combination with a plow including a plow beam, of a rear furrow wheel support comprising a frame adjustably connected to said beam for transverse adjustment relative to said beam, a member pivotally connected to said frame for vertical swinging movement, means carried by said frame for pivotal movement about an axis spaced from the pivot axis of said member for swinging said member to raise the plow from operating position to raised position, and a rear furrow wheel supported by said member.

3. The combination with a plow, of a rear furrow wheel supporting structure therefor comprising a bracket fixed to the rear of the plow, a frame adjustably connected to said bracket for transverse adjustment relative to the plow, a member pivotally connected to said frame for vertical swinging movement, means on said frame separate from and engageable with a portion of said member for swinging the latter to raise the plow from operating position to raised position, and a rear furrow wheel supported by said member.

4. In a plow, the combination of a plow beam, a diagonal frame member, a bracket fixed to said beam and having a socket for the reception of said frame member, a cap adapted to be clamped over said socket to clamp said frame member to said bracket, and a rear furrow wheel supporting structure carried by said cap.

5. In a plow, the combination of a plow beam, a diagonal frame member, a bracket fixed to said beam and having means for receiving said frame member, a cap adapted to be clamped over said frame member and cooperating with said means to secure the frame member and said bracket together, and a rear furrow wheel supporting structure detachably secured to said cap.

6. In a plow, the combination of a plow beam, a diagonal frame member, a bracket fixed to said beam and having a socket for receiving said frame member, a cap adapted to be clamped over said socket to clamp said frame member to said bracket, a rear furrow wheel supporting structure supported by said cap, and means providing for the adjustment of said structure laterally relatively to said cap.

7. The combination with a plow, of a rear furrow wheel supporting structure therefor comprising a frame connected to the rear end of the plow, a member having a generally downwardly disposed end and a laterally bent upper end pivotally connected to said frame for vertical swinging, a rear furrow wheel swiveled for lateral swinging on the downwardly disposed end of said member, and means mounted on the frame in rear of the pivotal connection of said member with the frame and engageable with said member above the lower end for swinging said member to raise the plow from operating position to transport position.

8. The combination with a plow, of a rear furrow wheel supporting structure therefor comprising a frame connected to the rear end of the plow, a member comprising a laterally bent portion at one end pivotally connecting said member to said frame for vertical swinging, a rear furrow wheel supported on the other end of said member, means including a lever pivotally mounted on said frame for swinging said member to raise the plow from operating position to transport position, an arm extending forwardly from said lever and underlying the rear portion of said frame, and means carried by said frame and positioned to contact with said arm to limit the swinging of said lever in one direction beyond a position corresponding to the operating position of the plow, said last named means being operative to adjust the position of said furrow wheel relative to the plow bodies when in operating position.

9. The combination with a plow, of a rear furrow wheel supporting structure therefor comprising a frame connected to the rear end of the plow, a member pivotally connected to said frame for vertical swinging, a rear furrow wheel supported by said member, means including a lever pivotally mounted on said frame in rear of the pivotal connection of said member with the frame and adapted to contact said member at a point intermediate the pivotal connection of said member with the frame and the furrow wheel for swinging said member to raise the plow from operating position to transport position, an arm extending forwardly from said lever, and a set screw on said frame and positioned to engage said arm for limiting the swinging of said lever in one direction beyond a position representing the operating position of the plow, said set screw providing means for adjusting the position of said furrow wheel relative to the plow bodies when in operating position.

10. The combination with a plow, of a rear furrow wheel supporting structure therefor comprising a rearwardly extending member pivotally connected to the plow for vertical swinging, a rear furrow wheel supported by said member, a lever pivotally connected to the plow and having an arm extending above said member, a roller on the end of said arm, means for preventing said lever swinging in one direction beyond a position representing the operating position of the plow, and means for rocking said lever in the other direction to cause said roller to engage said member and swing the latter downwardly to raise the plow from operating position to transport position.

11. The combination with a plow, of a rear furrow wheel supporting structure therefor comprising a rearwardly extending member pivotally connected to the plow for vertical swinging, a rear furrow wheel supported by said member, a lever pivotally connected with the plow and having an arm extending above said member, a roller on the end of said arm, means for preventing said lever swinging in one direction beyond a position representing the operating position of the plow, means for rocking said lever in the other direction to cause said roller to engage said member and swing the latter to raise the plow from operating position to transport position, and a pad on said arm adjacent said roller and positioned to contact with said member and release the pressure on said roller when the plow is in working position.

12. The combination with a plow, of a rear furrow wheel supporting structure therefor comprising a rearwardly extending member pivotally connected to the plow for vertical swinging, a rear furrow wheel supported by said member, a lever pivotally connected to the plow and having an arm extending above said member, a roller on the end of said arm, adjustable stop means for preventing said lever swinging in one direction beyond a position representing the operating position of the plow and providing for adjusting the position of said furrow wheel relative to the plow bodies when in operating position, means for rocking said lever in the other direction to cause said roller to engage said member and swing the latter to raise the plow from operating position to transport position, and means on said arm adjacent said roller and positioned to contact with said member and release the pressure on said roller when the plow is in working position.

13. The combination with a plow, of a rear furrow wheel, a supporting structure for connecting said wheel with the plow and including means for lifting the plow relative to the wheel from operating position to transport position and a support for the furrow wheel journaled on said supporting structure, said supporting structure including a member disposed substantially vertical when the plow is raised to provide for castering movement of said wheel, means for locking said support against rotation about said member when the plow is in operating position, including a forked member on said support and a roller held against lateral movement on said structure, said forked member having a recess adapted to receive said roller when the plow is lowered to operating position, and an eccentrically mounted sleeve upon which said roller is journaled to provide for lateral adjustment of the wheel relative to the plow when the plow is in operating position.

14. The combination with a plow, of a rear furrow wheel, a supporting structure for connecting said wheel with the plow and including means for lifting the plow relative to the wheel from operating position to transport position, and a support for the furrow wheel journaled on a portion of the structure, said portion being disposed substantially vertical when the plow is raised to provide for castering movement of said wheel, means for locking said support against rotation when the plow is in operating position and including a forked member on said support and a roller held against lateral movement on said structure, said forked member having a recess adapted to receive said roller when the plow is lowered to operating position, a pair of guide arms extending outwardly and upwardly from opposite sides of said recess, and cam means on said structure below said roller positioned to be contacted by either of said guide arms to cause said support to swing into a normal position so as to cause said roller to engage in said recess.

15. The combination with a plow, of a rear furrow wheel supporting structure therefor comprising a rearwardly extending frame connected to the rear of the plow, a member pivotally connected to said frame for vertical swinging, said member having a portion extending rearwardly from the point of its pivotal support and a journal portion disposed substantially vertical when the plow is raised, a wheel support journaled on said latter portion, a furrow wheel mounted on said wheel support, a lever pivotally mounted on the rear of said frame and having an arm extending forwardly over the rearwardly extending portion of said member, a roller on the end of said arm, means for preventing said lever from swinging in one direction beyond a position corresponding to the operating position of the plow, means for rocking said lever in the other direction to cause said roller to engage said member and swing the latter to raise the plow from operating position to transport position, and means for locking said support against rotation about the journal portion of said member when the plow is in operating position including a forked member extending rearwardly from said wheel support and having a centrally disposed recess, and a second roller carried by said lever and positioned to engage in said recess when the plow is in operating position.

16. The combination with a plow, of a rear furrow wheel supporting structure therefor comprising a generally vertically disposed member pivotally connected to the plow for vertical swinging, a furrow wheel support journaled on said member and having a rearwardly extending portion, a furrow wheel journaled on said portion, said furrow wheel support being adapted to swing about its journal axis to facilitate turning the plow, and means on said member cooperating with means fixed on said support for restraining the support against rotation on said member with sufficient force to prevent castering of the furrow wheel upon backing of the plow.

17. The combination with a plow, of a rear furrow wheel supporting structure therefor comprising a generally vertically disposed member pivotally connected to the plow for vertical swinging movement, a furrow wheel support journaled on said member and capable of limited axial movement relative thereto and having a rearwardly extending portion, a furrow wheel journaled on said portion, and releasable means restraining the support against rotation on said member upon backing of the plow when in raised position to prevent castering of the furrow wheel, said releasable means being so constructed that when a predetermined lateral stress is applied to the wheel when the plow is in raised position the support will be moved axially relative to said member and permit castering of the wheel.

18. The combination with a plow, of a rear furrow wheel supporting structure therefor comprising a generally vertically disposed member pivotally connected to the plow for vertical swinging movement, a furrow wheel support journaled on said member and having a rearwardly extending portion, a furrow wheel journaled on said portion, and releasable means comprising a lug fixed to said member engaging in a recess in said furrow wheel support for restraining the support against rotation on said member upon backing of the plow when in raised position to prevent castering of the furrow wheel, said lug being movable from said recess under lateral stress applied to the wheel to permit castering of the wheel when the plow is in raised position.

19. In a plow, the combination of a plow beam, a frame member, a bracket fixed to said beam and having a socket for the reception of said frame member, a cap adapted to be clamped over said socket to clamp said frame member to said bracket, and a rear furrow wheel supporting structure carried by said cap.

20. The combination with a plow, of a rear furrow wheel supporting structure therefor comprising a rearwardly extending member pivotally connected to the plow for vertical swinging, a rear furrow wheel supported by said member, a lever pivotally connected to the plow and having an arm adapted to contact said furrow wheel supporting member, means for rocking said lever in one direction to cause said arm to engage said member and swing the latter downwardly to raise the plow from operating position to transport position, and means movable into position to engage said member and relieve the contacting portion of said arm of pressure whenever said lever is rocked in the other direction to put the plow in working position.

21. The combination with a plow, of a rear furrow wheel supporting structure therefor comprising a rearwardly extending member pivotally connected to the plow for vertical swinging, a rear furrow wheel supported by said member, a lever pivotally connected to the plow and having an arm adapted to contact said furrow wheel supporting member, stop means for holding the furrow wheel supporting member in operating position, means for rocking said lever to cause said arm to engage said member and swing the latter downwardly to raise the plow from operating position to transport position, and means cooperating with said stop means and said arm and movable into position to engage said member and relieve the contacting portion of said arm of pressure whenever said lever is swung to put the plow in working position.

22. The combination with a plow, of a rear furrow wheel supporting structure therefor comprising a frame connected to the rear end of the plow, a member pivotally connected to said frame for vertical swinging, a rear furrow wheel supported by said member, means including a lever pivotally mounted on said frame and having an arm, means for rocking said lever in one direction to cause said arm to engage said member and swing the latter downwardly to raise the plow from operating position to transport position, and means reacting against said frame and movable into position to embrace said member and relieve the contacting portion of said arm of pressure whenever said lever is rocked in the other direction to put the plow in working position.

23. The combination with a plow including a plow beam, of a rear furrow wheel support comprising a bracket fixed to the plow beam, a frame adjustably connected with said bracket for transverse adjustment relative thereto, a member pivotally connected to said frame for vertical swinging movement, means movable relative to said member for swinging the latter to raise the plow from operating position to raised position, and a rear furrow wheel supported by said member.

24. The combination with a plow including a plow beam, of a rear furrow wheel support comprising a bracket fixed to the plow beam, a frame adjustably connected with said bracket for transverse adjustment relative thereto, a member pivotally connected to said frame for vertical swinging movement, means movably carried by said transversely adjustable frame for swinging said pivoted member to raise the plow from operating position to raised position, and a rear furrow wheel supported by said member.

25. The combination with a plow including a plow beam, of a rear furrow wheel support comprising a frame adjustably connected to said beam for transverse adjustment relative to said beam, bolt means for holding said frame in its transversely adjustable positions, a member pivotally connected to said frame for vertical swinging movement, means movable relative to said member for swinging the latter to raise the plow from operating position to raised position, and a rear furrow wheel supported by said member.

26. The combination with a plow, of a rear furrow wheel supporting structure therefor comprising a frame connected to the rear end of the plow, a member having a laterally bent portion at one end pivotally connecting said member to said frame for vertical swinging movement, a rear furrow wheel supported on the other end of said member, means including a lever pivotally mounted on said frame for swinging said member to raise the plow from operating position to transport position, and screw-threaded means carried by and reacting against said frame for adjusting the vertical position of said furrow wheel relative to the plow bodies.

27. The combination with a plow, of a rear furrow wheel supporting structure therefor comprising a frame connected to the rear end of the plow, a member having a laterally bent portion at one end pivotally connecting said member to said frame for vertical swinging movement, a rear furrow wheel supported on the other end of said member, a lever pivotally mounted on said frame and including an arm extending forwardly therefrom and operative to swing said member to raise the plow from operating position to transport position, and screw-threaded means carried by and reacting against said frame for adjusting the vertical position of said furrow wheel relative to the plow bodies.

28. The combination with a plow, of a rear furrow wheel supporting member pivotally connected to the plow for vertical swinging, a furrow wheel swiveled on said member, an actuating member pivotally connected to the plow at a point spaced rearwardly from the point of pivotal connection of the furrow wheel supporting member, said actuating member adapted to engage the furrow wheel supporting member and cause it to swing forwardly to raise the plow upon rotation of the actuating member in the direction which swings the engaging portion downwardly, and means carried by the actuating member for locking the rear furrow wheel against swiveling movement when the plow is in operating position.

29. The combination with a plow, of a rear furrow wheel supporting structure therefor comprising a generally vertically disposed member pivotally connected to the plow for vertical swinging, a furrow wheel support swivelly connected to said member, a furrow wheel journaled on said support, and means on said member cooperating with means on said support for restraining castering of said furrow wheel, said restraining means being adapted to yield under a predetermined lateral force applied against said wheel.

30. The combination with a plow, of a rear furrow wheel supporting structure therefor comprising a generally vertically disposed member pivotally connected to the plow for vertical swinging, a furrow wheel support swivelly connected to said member and capable of limited axial movement relative thereto, a furrow wheel journaled on said support, and means on said member cooperating with means on said support for restraining swiveling action therebetween, said restraining means being adapted to move said member and said support relatively axially when a predetermined lateral force is applied to said wheel, thereby releasing said restraining means to permit said swiveling action.

31. The combination with a plow, of a rear furrow wheel supporting structure therefor comprising a member pivotally connected to the plow for vertical swinging, a furrow wheel support connected to said member and rotatable on a longitudinal axis relative thereto, a furrow wheel journaled on said support, a pair of cooperative cam elements disposed on said member and said support, respectively, for holding said wheel in position for straight line travel of the plow, said cam elements being held in cooperation by a gravitational force and adapted to yield to a predetermined lateral force against said wheel to permit castering of the wheel.

32. The combination with a plow, of a rear furrow wheel supporting structure therefor comprising a pair of swivelly connected members, one of said members being pivotally connected to the plow for swinging in a vertical plane, the other of said members having an axle portion, a furrow wheel journaled on said axle portion, one of said members being provided with a V-shaped cam and the other with a V-shaped notch, said cam and notch being held in cooperation by a gravitational force to maintain said wheel in alinement for straight line advance of the plow and adapted to yield to a predetermined lateral force against said wheel to permit castering of the wheel.

EMIL F. OHLENDORF.